United States Patent [19]
Kume et al.

[11] Patent Number: 5,617,490
[45] Date of Patent: Apr. 1, 1997

[54] CAMERA SYSTEM WITH NEURAL NETWORK COMPENSATOR FOR MEASURING 3-D POSITION

[75] Inventors: Masao Kume, Hirakata, Japan; Takeo Kanade, Pittsburgh, Pa.

[73] Assignee: Sanyo Electric Co., Ltd., Osaka, Japan

[21] Appl. No.: 266,136

[22] Filed: Jun. 27, 1994

[51] Int. Cl.$^6$ .............................. G06T 1/40; G06T 5/00
[52] U.S. Cl. ........................................ 382/275; 382/156
[58] Field of Search .................................. 348/207, 208, 348/222; 382/155, 156, 157, 158, 275; 395/21, 23

[56] References Cited

U.S. PATENT DOCUMENTS

| | | | |
|---|---|---|---|
| 4,727,471 | 2/1988 | Driels et al. | 382/153 |
| 5,276,519 | 1/1994 | Richards et al. | 358/209 |
| 5,420,939 | 5/1995 | da Silva | 382/181 |
| 5,459,636 | 10/1995 | Gee et al. | 382/199 |

OTHER PUBLICATIONS

"Sensor Integration System Utilizing Fuzzy Inference With LED", Shimajima et al. Fuzzy Systems, Int'l Conference 1993.

"NonLinear Camera Calibration Using Neural Networks" Doo-hyun Choi et al. Neural, Parallel & Scientific Computations vol. 2, No. 1, (1994).

Roger Y. Tsai, "A Versatile Camera Calibration Technique for High–Accuracy 3D Machine Vision Metrology Using Off–the–Shelf TV Cameras and Lenses", IEEE Transactions on Pattern Analysis and Machine Intelligence, vol. 11, No. 5, pp. 451–476, 1987.

Juyang Weng, et. al., "Camera Calibration with Distortion Models and Accuracy Evaluation", IEEE Transactions on Pattern Analysis and Machine Intelligence, vol. 14, No. 10, pp. 965–980, Oct. 1992.

David A. Butler et. al., "A distortion–Correction Scheme for Industrial Machine–Vision Applications", IEEE Transactions on Robotics and Automation, vol. 7, No. 4, pp. 546–551, Aug., 1991.

"Three–View Stereo Analysis", Minoru Ito and Akira Ishi, IEEE Transactions on Pattern Analysis and Machine Intelligence, vol.Pami–1, No. 4, pp. 524–532, Jul. 1986.

*Primary Examiner*—Michael T. Razavi
*Assistant Examiner*—Larry J. Prikockis
*Attorney, Agent, or Firm*—Loeb & Loeb LLP

[57] ABSTRACT

A camera system has a neural network for calibration of image distortion. The neural network learns the conversion from image coordinates with distortion to image coordinates with substantially reduced distortion, whereby the neural network provides image coordinates having substantially reduced distortion. In a learning process of the neural network, a relatively simple camera model is used to provide an instruction signal to the neural network according to sample data provided from the real camera.

7 Claims, 4 Drawing Sheets

CAMERA SYSTEM WITH NEURAL NETWORK COMPENSATOR FOR MEASURING 3-D POSITION

FIELD OF THE INVENTION

The present invention relates to a camera system. More particularly, the present invention relates to a camera system which provides image coordinates of objects which have substantially reduced distortion.

BACKGROUND OF THE INVENTION

When a video camera is used for a measuring operation or a recognizing operation in a robot system, output images from an imaging device of the video camera are usually stored in a digital memory. An image processing apparatus receives an output from the digital memory and derives image coordinates which represent characteristic points, such as, for example, corner points of objects.

The image coordinates provided from the image process apparatus are two-dimensional coordinates associated with the digital memory and the imaging device. Since objects to measure or to recognize are in three-dimensional coordinates, to measure or recognize the objects requires conversion from the two-dimensional coordinates to the three dimensional coordinates. For the coordinate conversion, a mathematical camera model, which mathematically describes a production process of the image coordinates from the objects, is used. By using the mathematical camera model, coordinate values of the object in the three-dimensional coordinates can be obtained from the image coordinates in the two-dimensional coordinates.

Several mathematical camera models have been presented by researchers. Each mathematical camera model has common camera parameters, such as, for example, a position and an orientation of the camera (external parameters), a focal length and an image center (internal parameters).Generally, the camera parameters are determined by camera calibration. Since the derivation of coordinate values of the object is achieved by using the mathematical camera model, preciseness of measurement of the object is influenced by the camera parameters of the mathematical camera model. In other words, it is important for the camera calibration to determine these camera parameters precisely.

On the other hand, it is also important for the camera calibration to determine camera parameters instantly, especially in a real-time system. Generally, the camera parameters can be obtained quickly in a simple camera model. However preciseness of the camera parameters cannot be expected. On the other hand, in a complex camera model, the camera parameters can be obtained precisely but not quickly. Therefore, there is a contradiction in the mathematical model between precision and quickness.

To solve this contradiction, several camera models are proposed. For example, articles, such as, "A Versatile Camera Calibration Technique for High-Accuracy 3D Machine Vision Metrology Using Off-The-Shelf TV Cameras and Lenses" (R. Y. Tsai, IEEE Trans. Pattern Analysis and Machine Intelligence, Vol. 11, No. 5, pp451– 496, 1987) and "Camera Calibration with Distortion Models and Accuracy Evaluation" (J. Weng et al, IEEE Trans. Pattern Analysis and Machine Intelligence, Vol. 14, No. 10, pp965–980, 1992), propose non-linear camera models and "Two-Step Methods". In these articles, the non-linear camera models contain distortion models, which describe distortion provided by a camera system.

Generally, a non-linear system has difficulty obtaining an optimized solution; namely, to get precise camera parameters. This is because a non-linear system has a plurality of limit values in its evaluation function. The methods which are described in the two articles also have the same difficulties. Further, because the methods which are described in the two articles use simplified distortion models in their system, the solutions obtained thereby have limited preciseness. As described above, it is difficult to solve the contradiction present in the camera calibration by simply improving a camera model.

SUMMARY OF THE INVENTION

An object of the present invention is to provide a new camera system which provides image coordinates with substantially reduced distortion.

Another object of the present invention is to provide a new camera calibration method with improved preciseness and quickness.

These and other object are achieved by a camera system which includes a real camera and a neural network. The neural network determines a transformation from image coordinates with distortion to image coordinates with substantially reduced distortion, so that the neural network provides image coordinates having substantially reduced distortion. In a learning process of the neural network, a relatively simple camera model is used to provide an instruction signal to the neural network according to sample data from the real camera.

DETAILED DESCRIPTION (1) A new camera system

Figure 1:
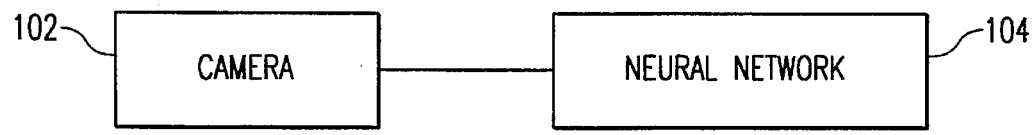
FIG. 1 is a block diagram showing a basic structure of a camera system according to the present invention.

FIG. 1 shows a basic structure of a camera system according to the present invention. The camera system has a real video camera 102 and a neural network 104. The real video camera 102 generally consists of a camera portion and a signal processing portion (not shown). The camera portion provides the object's image of an object to the signal processing portion. The signal processing portion derives characteristic points from the object image and provides image coordinates of the characteristic points to the neural network 104.

The neural network 104 determines a transformation from image coordinates with distortion to image coordinates having substantially reduced distortion. In the learning process for enabling such determination, one training model (an early training model, not shown in FIG. 1) is selected. The early training model provides an instruction signal to the neural network during the learning process.

After the learning process of the neural network is completed, the total characteristics of the camera system including the neural network become close to those of the early training model. Therefore, the neural network 104 achieves the transformation from the image coordinates having distortions provided from the real video camera to the image coordinates having substantially reduced distortion.

(2) The learning procedure of the neural network

Figure 2:
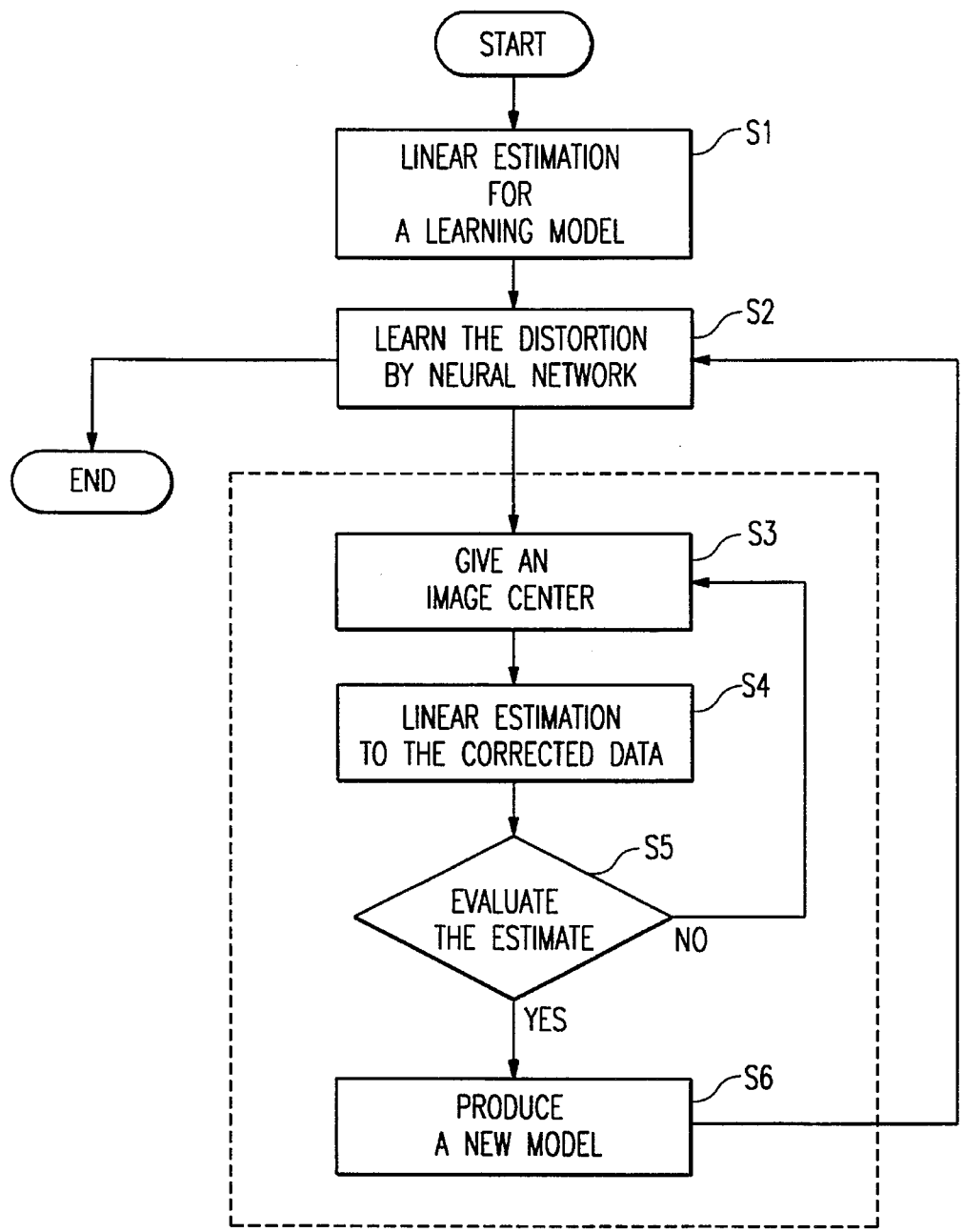
FIG. 2 is a flow chart showing a learning process for a neural network.

FIG. 2 shows the learning procedure of the neural network 104. First, the early training model is constructed according to a linear estimation in a Step S1. Next, and with respect to a plurality of control points, the neural network 104 learns a transformation based on image coordinates obtained from the real video camera 104 and the output image coordinates from the early training model (in a Step S2). In the following steps, optimization of the training model is achieved. In a Step S3, an image center, which is one of the camera parameters obtained in the Step S1, is provided to the early training model. In a Step S4, according to image coordinates having substantially reduced distortion provided from the neural network 104 and the image center, a revised training model is constructed by linear estimation.

In a Step S5, an estimation of the revised training model is made. If the revised training model is determined not to be close enough to an ideal training model, the process returns to the Step S3 and the training model is revised again. A standard for determining that the revised training model is not close enough to the ideal training model, is, for example, that the difference between an estimated camera position and a real camera position, which is one of the camera parameters, is more than a predetermined value.

If the revised training model is determined to be close enough to the ideal training model, a new training model is produced from the revised training model (in a Step S6). Therefore, the process returns to the Step S2, the learning operation of the neural network 104 by using the latest training model is achieved and the learning of the neural network 104 is completed.

(3) Production of a training model (Step S1)

The learning operation of the neural network 104 requires a training model which provides an instruction signal to the neural network 104. In the embodiment described, an early training model is derived by the Closed form method, an example of which is described in the article "Three-View Stereo Analysis", IEEE Trans. Pattern Analysis and Machine Intelligence, Vol. 8, No. 4, 1986. In the Closed form method: first, linear equations are obtained by introducing intermediate parameters to a pin-hole camera model; secondly, the least squares method is applied to the linear equations; and finally, estimated values of parameters of the pin-hole camera model are provided. The derivation of fundamental equations of the pin-hole camera model is described as follows.

Figure 3:
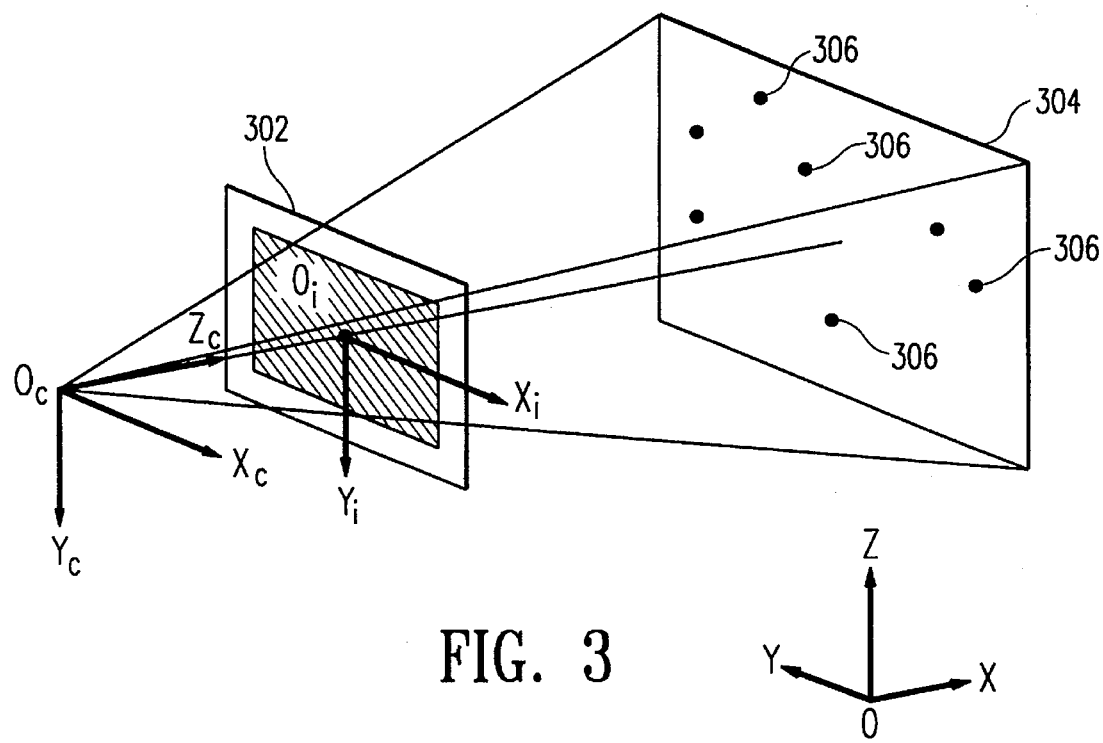
FIG. 3 is an illustrative view of a pin-hole camera model.

FIG. 3 shows that a geometrical relation exists among a world coordinate O-XYZ, a camera coordinate $O_c$-$X_c Y_c Z_c$ and a two-dimensional coordinate (image coordinate) $O_i$-$X_i Y_i$ of an imaging device of camera. The imaging device contains an imaging plane. Light from an object to the camera is focused to an origin $O_c$ of the camera coordinates $O_c X_c Y_c Z_c$ in the pin-hole camera model. The imaging plane 302 is perpendicular to an axis $Z_c$ of the camera coordinates $O_c$-$X_c Y_c Z_c$. A plane $X_c$-$Y_c$ is in parallel with the imaging plane 302, for convenience of the estimation. An image center $O_i$ is defined at an intersection between the image plane 302 and the axis $Z_c$. The distance between the origin $O_c$ and the origin $O_i$ is defined as a focal length f.

A point (x, y, z) of the World coordinates is transferred into a point ($X_c$, $Y_c$; $Z_c$) of camera coordinates by a parallel translation and a rotation as follows:

$$\begin{bmatrix} X_c \\ Y_c \\ Z_c \end{bmatrix} = \text{Rot} \begin{bmatrix} x \\ y \\ z \end{bmatrix} + Tr \quad (1)$$

where Rot is a rotation matrix defined by an equation Rot=$[r_{ij}] \ominus R^{3*3}$, and Tr is a parallel transformation vector defined by an equation Tr=$[t_1 \ t_2 \ t_3]^T$.

Each point on the camera coordinates is focused on a point ($x_i$, $y_i$) on the imaging plane. According to the pin-hole camera model, $x_i$ and $y_i$ are given as follows:

$$x_i = \frac{fx_c}{z_c} \quad (2)$$

$$y_i = \frac{fy_c}{z_c}$$

Further, each point ($x_i$, $y_i$) is linear-transferred on the digital memory, as follows:

$$u - u_0 = \lambda_u x_i \quad (3)$$
$$v - v_0 = \lambda_v y_i$$

where $\lambda_u$ and $\lambda_v$ are scale factors.

According to the equations (1), (2) and (3), fundamental equations of the pin-hole camera model are derived as follows.

$$u - u_0 = s_u \frac{r_{11}x + r_{12}y + r_{13}z + t_1}{r_{31}x + r_{32}y + r_{33}z + t_3} \quad (4)$$

$$v - v_0 = s_v \frac{r_{23}x + r_{22}y + r_{23}z + t_2}{r_{31}x + r_{32}y + r_{33}z + t_3}$$

where, $s_u = \lambda_u f$, $s_v = \lambda_v f$.

Next, assuming that the z axis orientation of the world coordinate is the same as the z axis orientation of the camera coordinate, camera parameters of the pin-hole camera model are obtained by the linear estimation method in which the order of linear equations is reduced. These linear equations are derived from the fundamental equations (4) set forth above. Hereinafter, the linear estimation method is referred to as the "first linear estimation" (Let-1).

Assuming $[r_{31} r_{32} r_{33}]=[0 \ 0 \ 1]$, the fundamental equations (4) are transformed as follows:

$$t_3 u + B_1 x + B_2 y + B_3 z + B_4 = -uz \quad (5)$$
$$t_3 v + B_5 x + B_6 y + B_7 z + B_8 = -vz$$

where intermediate parameters $B_1$–$B_8$ are defined as follows:

$B_1 = -s_u r_{11}$
$B_2 = -s_u r_{12}$
$B_3 = -u_0$
$B_4 = -u_0 t_3 - s_u t_1$
$B_5 = -s_v r_{21}$
$B_6 = -s_v r_{22}$
$B_7 = -v_0$
$B_8 = -v_0 t_3 - s_v t_2$

Nine unknown intermediate parameters $B_1$–$B_8$ and $t_3$ in the equation (5) set forth above are determined by the least squares method in which several sample data obtained from the real camera are used. Enough sample data is selected to determine the camera parameters. Further, according to the orthogonality of the image coordinate axis, the camera parameter of the pin-hole camera model, which is defined in the fundamental equations (4), is decided, whereby the early training model of the neural network 104 is produced.

The assumption of the first linear estimation (Let-1), namely, that the z axis orientation of the camera coordinate is the same as the orientation of the z axis of world coordinate, is realized on producing the early training model by using a flat panel 304 in FIG. 3 which is an object of the camera 102 whose optical axis (namely z axis) is perpendicular to the flat panel 304. The flat panel 304 has several points 306 on its surface. The points are used as the sample data when the early training model is produced.

(4) The learning of the neural network

Figure 4:
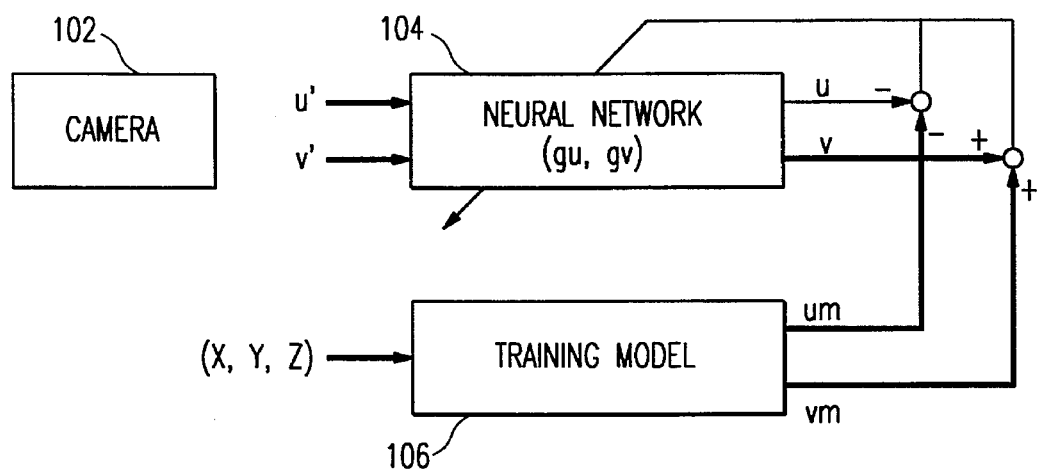
FIG. 4 is an illustrative block diagram showing the relation between the neural network and a training model.

Referring to FIG. 4, the learning process of the neural network is described. As described above, the real video camera 102 consists of a camera portion and a signal process portion. The camera portion provides the image of an object to the signal process portion. The signal process portion derives characteristic points from the object image and provides image coordinates of the characteristic points to the neural network 104. The neural network 104 receives the coordinate values and provides its output according to the characteristics of the neural network. The training model 106, whose parameters are decided during the previous process, provides instruction signal to the neural network 104 according to the coordinate values (x, y, z) of the world coordinate. The training model 106 is formed, such as, for example, by a micro-computer. The neural network 104 adjusts its characteristics according to a difference between a present output of the neural network and the instruction signal ($u_m$, $v_m$) from the training model 106 and reduces the difference. That is the learning operation of the neural network 104.

The output from the real camera 102 is expressed as follows:

$$u' = u + \delta_u(u,vb) \qquad (6)$$
$$v' = v + \delta_v(u,v)$$

The point (u', v') is an image coordinate which is provided from the signal process portion, namely an image coordinate which is captured by the camera portion. Further, the image coordinate (u', v') is associated with a known image coordinate (control point) (x, y, z) of the world coordinate. The image coordinate (u, v) is a desired image coordinate with substantially reduced distortions. Notations $\delta_u(u, v)$ and $\delta_v(u, v)$ are distortion functions and express distortions included in the output of the real camera.

The neural network 104 receives the image coordinate (u', v') which corresponds to the control points, and further receives the instruction signal ($u_m$, $u_m$). Therefore, the neural network learns an inverse function of the distortion function (hereinafter inverse distortion function) $g_u$, $g_v$ as follows:

$$u = g_u(u',v') \qquad (7)$$
$$v = g_v(u',v')$$

In other words, the neural network 104 learns and thereby determines a transformation from image coordinates having distortion to image coordinates having substantially reduced distortions, which closely resembles the training model 106. Namely, the neural network determines the distortion of the real camera indirectly.

Figure 5:
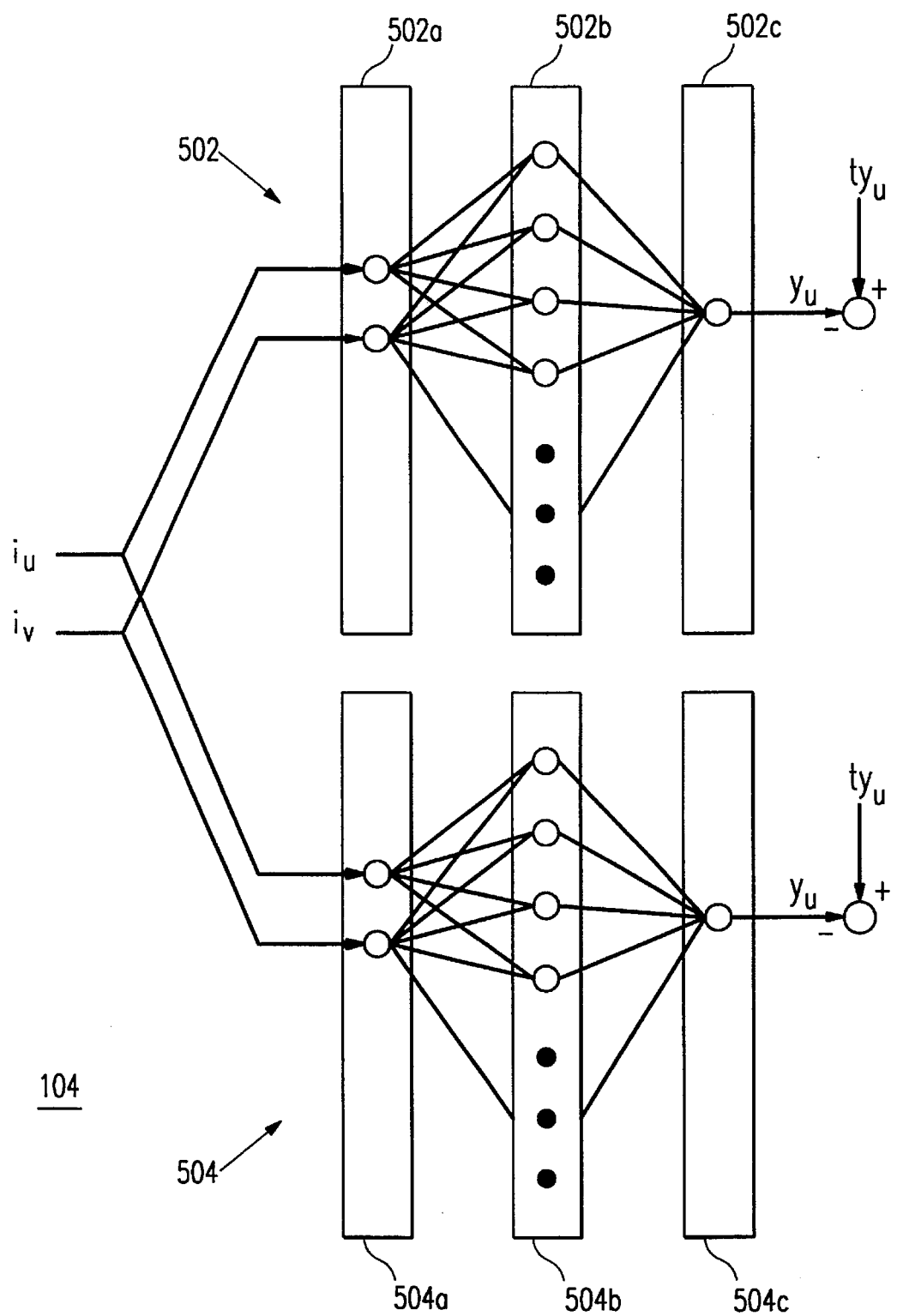
FIG. 5 is an illustrative block diagram showing a structure of neural networks.

FIG. 5 illustratively shows a structure of the neural network 104. The neural network 104 has a first unit 502 and a second unit 504. The first unit 502 is provided for generating an image coordinate value u. The second unit 504 is provided for generating an image coordinate value v.

The first and second units 502 and 504 are Multi-Layered Perceptron. Each unit 502 and 504 has three layers, namely an input layer 502a, 504a, an intermediate layer 502b, 504b and an output layer 502c, 504c. Further, each layer contains at least one cell which receives an input from the network and provides an output according to its transfer function. In the embodiment, the input layer has two cells, the intermediate layer has 10 cells and the output layer has one cell. In each unit 502 and 504, input signals are transferred only in one direction. There are no connections among cells in the same layer. A bipolar sigmoid function is mainly used as the transfer function of each cell, except for two cells in the intermediate layer 502b and 504b. The two cells in the intermediate layer have a linear transfer function so that the neural network 104 learns quickly. The Multi-Layered Perceptron is described in detail in *Neurocomputing: Foundation of Research* (J. A. Anderson and B. Rosenfield, The MIT press, 1990).

A Conjugate Gradient method is used in the learning process of the neural network 104. The Conjugate Gradient method is described in *Numerical Recipes in C* (William H. et al, Cambridge University Press, 1990). By using the Conjugate Gradient method, inner parameters of the neural network 104 change so as to minimize a cost function, as follows:

$$E = \sum_b \sum_c (y_{c,b} - {}^t y_{c,b})^2 \qquad (8)$$

where $y_{c,b}$ is an output signal of the neural network 104, and ${}^t y_{c,b}$ is the instruction signal. Further, c is equal to the number of the cells in the output layer, and b is equal to the number of sample data.

The input signal of the neural network 104 and the instruction signal are defined, respectively, as follows:

$$i_u = (u' - u_0)/\eta \qquad (9)$$
$$i_v = (v' - v_0)/\eta$$
$${}^t y_u = (u_m - u_0)/\eta$$
$${}^t y_v = (v_m - v_0)/\eta$$

where ($u_0$, $v_0$) is the image center which is obtained from the early training model, and $\eta$ is a constant for adjusting a value region. Here $\eta$ is set at 100.

After the learning process, the neural network 104 provides image coordinates ($y_u$, $y_v$) and according to these image coordinates, corrected image coordinates are obtained, as follows:

$$u = \eta y_u + u_0 \qquad (10)$$
$$v = \eta y_v + v_0$$

(5) Optimization of the training model

Because there is no guarantee that an optimized training model will be obtained by the linear estimation method, it is not yet confirmed whether the early training model represents an optimized training model. Therefore, it is necessary to optimize the training model for insuring consistency of the output of neural network 104. In other words, if the training model is not optimized, there is a possibility that the characteristics of the training model will be different in each production of the training model.

For optimization, by using the output signal from the neural network 104 with the early training model, the parameters of the pin-hole camera model are estimated again and the training model is revised. Further, by using a new output signal obtained from the neural network 104 with a revised training model, the parameters of the pin-hole camera model are estimated and the training model is revised. These operations are repeated several times, for example, three times. The linear estimation method with a known image center is used for the estimation of the parameters in the pin-hole camera model. This linear estimation method is different from the Let-1, and this second linear estimation method is called (Let-2). First, the description of the Let-2 is made as follows:

The fundamental equations of the pin-hole camera model (4) are transformed as follows.

$$r_{31}(u_n x) + r_{32}(u_n y) + r_{33}(u_n z) + B_1 x + B_2 y + B_3 y + B_4 = -t_3 u_n$$
$$r_{31}(v_n x) + r_{32}(v_n y) + r_{33}(v_n z) + B_5 x + B_6 y + B_7 z + B_8 = -t_3 v_n$$
(11)

where $u_n = u - u_0$ $v_n = v - v_0$ $B_1 = -s_u r_{11}$ $B_2 = -s_u r_{12}$ $B_3 = -s_u r_{13}$ $B_4 = -s_u t_1$ $B_5 = -s_v r_{21}$ $B_6 = -s_v r_{22}$ $B_7 = -s_v r_{23}$ $B_8 = -s_v t_2$ Using orthogonality of the image coordinate, we can eliminate a vector $v_3[r_{31}, r_{32}, r_{33}]$ from the equations (11) and obtain the following equation:

$$B_1(v_n x) + B_2(v_n y) + B_3(v_n z) + B_4 v_n - B_5(u_n x) - B_6(u_n y) - B_7(u_n z) - B_8 u_n = 0$$
(12)

Further, assuming $B_8 \neq 0$, and dividing both sides of the equation (14) by $B_8$, the coefficient $B_1/B_8$, $B_2/B_8$, $B_3/B_8$, $B_4/B_8$, $B_5/B_8$, $B_6/B_8$ and $B_7/B_8$ can be determined by using the least squares method. These coefficients are expressed as $\theta_1, \theta_2, \theta_3, \theta_4, \theta_5, \theta_6$ and $\theta_7$ respectively in the following equations:

$$t_2 = \frac{sgn(t_2)}{\sqrt{\theta_5^2 + \theta_6^2 + \theta_7^2}}$$

$$v_2 = [r_{21} r_{22} r_{23}] = t_2[\theta_5 \theta_6 \theta_7]$$
$$v_1 = [r_{11} r_{12} r_{13}] = t_1[\theta_1 \theta_2 \theta_3]$$
where $$\hat{t}_1 = \frac{sgn(t_2)}{\sqrt{\theta_1^2 + \theta_2^2 + \theta_3^2}}$$

$$v_3 = \frac{(v_1 v_2)}{|v_1 v_2|}$$

where notation sgn (x) represents a value having x's sign (+ or −) and an amount of "1". For example, it is preferable to use the sign of $t_2$ which is obtained from a former estimation of the early training model.

Further, adapting an estimation of the rotational matrix to the next linear equations, the parameter of the pin-hole camera model is decided.

$$t_3 u_n + B_1 x + B_2 y + B_3 z + B_4 = r_{31}(u_n x) + r_{32}(u_n y) + r_{33}(u_n z)$$
$$t_3 v_n + B_1 x + B_2 y + B_3 z + B_4 = r_{31}(v_n x) + r_{32}(v_n y) + r_{33}(v_n z)$$
(13)

Next, a revision process of the training model is formulated as follows. Obtained image coordinates are expressed by using the camera model M, the distortion elements $D_t$ and noise element N, as follows:

$$D_a = M + D_t + N$$ (14)
where
$D_a = \{Im \backslash Data(Im)\}$
$M = \{Im \backslash Model(Im)\}$
$N = \{Im \backslash Noise(Im)\}$ $Im = (u, v)$ Assuming that the noise element is ignored, a desired camera model is $M_0$ and a corresponding distortion is $D_{t0}$, then a camera model and a distortion are generally expressed as follows:

$$M + D_t = M_0 + D_{t0}$$ (15)

From the equation (15), learned distortion $D_t$ contains a model difference $(M_0 - M)$ and actual distortion $D_{t0}$. If the model difference $(M_0 - M)$ is so small that the model difference has a small effect on the linear estimation as a disturbance, we can obtain an elaborated training model from the corrected image data provided from the neural network 104. The revision process of the training mode is based on this supposition.

(i) The data correction by the neural network and the revision of the training model.

The data correction and the revision of the training model are achieved according to the following equations:

$$D_{a2} = D_{a1} - D_{t1}$$
$$M_2(c) = L_e(D_{a2}, c)$$
(16)

where an initial data $D_{a1}$ is equal to $M_1(c_1) + D_{t1} + N$ (in which $M_1(c_1)$ represents the initial training model with image center $c_1$). Namely, the initial data $D_{a1}$ has not been corrected by the neural network 104 yet. Further, $L_e(D_a, c)$ means that the second linear estimation method (Let-2) is adapted to the obtained image coordinates $D_a$ and a given image center c and a revised training model is produced.

In the revising procedure, control points are provided to the neural network 104, and the neural network 104 learned by the training model $M_1$ eliminates the distortion $D_{t1}$ from the data $D_{a1}$ and provides corrected data $D_{a2}$ which is a set of image coordinates (u, v). The set of image coordinates (u, v) have a substantially reduced distortion of the real camera by the neural network 104 according to the training model $M_1$.

Next, by using the obtained second data $D_{a2}$ and the given image center c, the revision of the initial training model is achieved by the Let-2 and the first revised training model $M_2$ is obtained.

(ii) Further revision of the training model and data correction

Further, according to the following equations, the data correction and revision of the training model are achieved by linear estimation:

$$D_{ak+1} = D_{ak} + (M_K(c) - M_{k-1}(c))$$
$$M_{k+1}(c) = L_e(D_{ak+1}, c)$$
(17)

Where k equals 2 or 3.

The second data $D_{a2}$ and the model difference between the first revised training model $M_2(c)$ and the early training model $M_1$ are added to provide third data $D_{a3}$. Further, based on the obtained corrected data $D_{a3}$ and the given image center c, a second revised training model $M_3(c)$ is produced by using the Let-2 method.

The third data $D_{a3}$ and the model difference between the second revised training model $M_3(c)$ and the first revised training model $M_2$ are added to provide a fourth data $D_{a4}$. Further, according to the obtained corrected data $D_{a4}$ and the given image center, a third revised training model $M_4(c)$ is produced, by using the Let-2 method.

After the production of the third revised training model $M_4(c)$, an evaluation of the third revised training model is achieved. This evaluation is made according to the distance between an estimated camera position $(t_1, t_2, t_3)$ of the third revised training model $M_4(c)$ and actual camera position. In other words, if the distance between the estimated camera position ($t_1$, $t_2$, $t_3$) of the third revised training model $M_4(c)$ and the actual camera position is less than a predetermined value L, the third revised training model $M_4(c)$ is considered as a good training model.

If the distance between the estimated camera position ($t_1$, $t_2$, $t_3$) of the third revised training model $M_4(c)$ and the actual camera position is more than a predetermined value L, the revision of the training model is achieved again by using a new image center. On the other hand, if the distance between the estimated camera position ($t_1$, $t_2$, $t_3$) of the third revised training model $M_4(c)$ and the actual camera position is less than the predetermined value L, the obtained third revised training model $M_4(c)$ is used as the latest training model for the neural network 104. The neural network 104 then learns with the latest training model $M_4(c)$, and the camera system is completed.

In the present embodiment, the distance between the estimated camera position ($t_1$, $t_2$, $t_3$) and the actual camera position is used to evaluate the revised training model. In other words, the distance is a value of an evaluate function for the revised training model. It is preferable to use other camera parameters for evaluating the revised training model.

Further, it is preferable to use the simplex method, which is a method to obtain the least value of the function, for searching the optimized training model. For example, giving the three different image centers $c_1$, $c_2$, $c_3$ to the revised training model $M_4$, three different revised training models $M_4(c_1)$, $M_4(c_2)$, $M_4(c_3)$ are obtained. Among these three examples $M_4(c_1)$, $M_4(c_2)$ and $M_4(c_3)$, one model, which has the largest distance between the estimated camera position ($t_1$, $t_2$, $t_3$) of the third revised training model $M_4(c)$ and the actual camera, is selected. Hereinafter, assume that the training model $M_4(c_2)$ has the largest distance.

Next, the forth image center $c_4$ determined. The forth image center $c_4$ is located on the other side of and a predetermined distance from the image center $c_2$ when the line $c_1-c_3$ is set at a symmetry axis. The image centers $c_1$, $c_3$, $c_4$ are used in the next step. In a manner similar to the previous step, the image centers $c_1$, $c_3$, $c_4$ are applied to the revised training model $M_4(c)$. Further, among these three examples $M_4(c_1)$, $M_4(c_3)$ and $M_4(c_4)$, one model, which has the largest distance between the estimated camera position ($t_1$, $t_2$, $t_3$) of the third revised training model $M_4(c)$ and the actual camera, is selected and the fifth image center is decided in the same manner as described above. To repeat these procedures and to compare each distance of three image center with the predetermined value L, an optimized training model can be found.

(6) Consideration to the evaluation method

Figure 6:
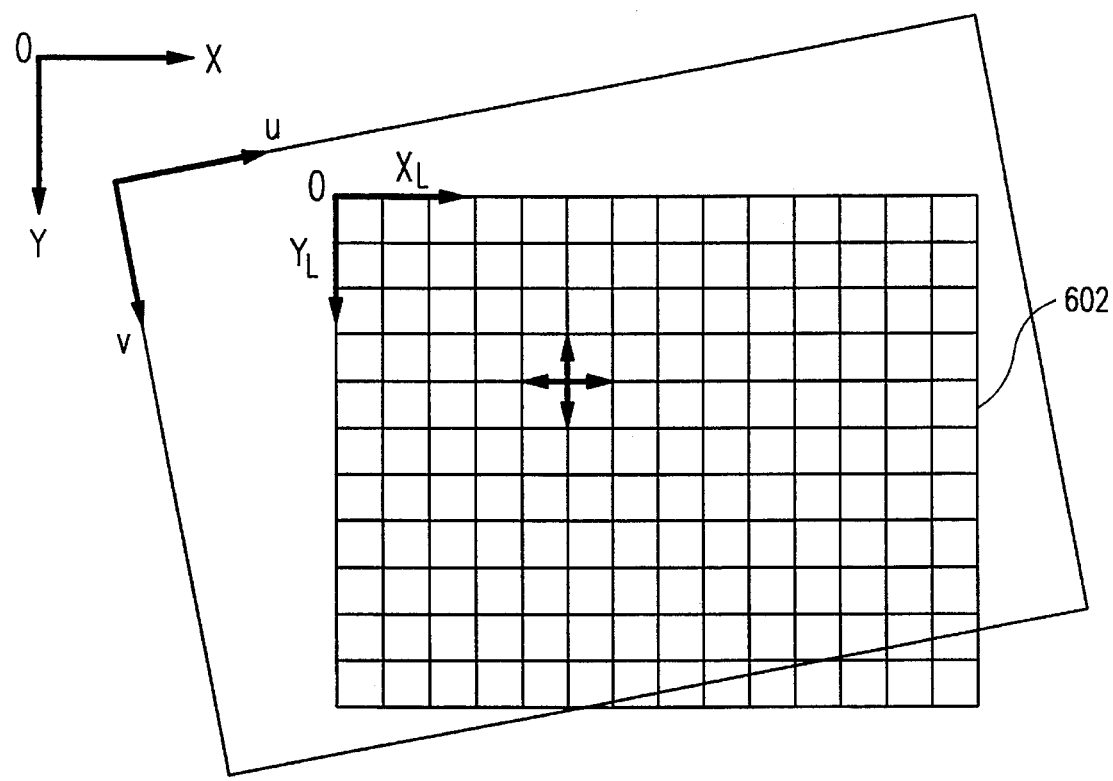
FIG. 6 is an illustrative view showing a method of providing control points.

To evaluate the optimization of the training model, synthetic data is used. FIG. 6 shows a concept of giving data points. It is necessary that the image coordinates contain distortions for evaluating the camera system. A data lattice 602 is located on a plane which is perpendicular to the z axis of the world coordinate O-XY. The data lattice 602 has an arbitrary translation from the origin of image coordinate o-uv and an arbitrary rotation (roll angle) on the z axis. Each cross points of the data lattice 602 is an image coordinate for the neural network 104. The location of the cross points is displaced at random along a lattice line because of the implementation of a distortion to the image coordinates. The arbitrary parallel translation has standard deviations ($S_{1x}$, $S_{1y}$) along the x axis and the y axis, and the displacement of the cross points has standard deviations ($S_{2x}$, $S_{2y}$). These standard deviations are defined as follows, when distance between two adjacent lattices are respectively $L_x$ along the x axis and $L_y$ along the y axis:

$$S_{1x} = L_x, S_{1y} = L_y, S_{2x} = \frac{L_x}{4}, S_{2y} = \frac{L_y}{4}$$

As to distortion, we use Weng's distortion model as follows (See an article "Camera Calibration with Distortion Models and Accuracy Evaluation" J. Weng et al, IEEE Trans. Pattern Analysis and Machine Intelligence, Vol. 14, No. 10, pp965–980, 1992):

$$\delta_u = (g_1 + g_2)P^2 + g_4pq + g_1q^2 + k_1p(p^2 + q^2) \quad (18)$$
$$\delta_v = g_2P^2 + g_3pq + (g_2 + g_4)q^2 + k_1q(p^2 + q^2)$$

where $$p = \frac{(u - u_0)}{s_u}$$

$$q = \frac{(v - v_0)}{s_v}$$

Where, k, $g_1$, $g_2$, $g_3$ and $g_4$ are constants. The image coordinates with distortion are expressed as follows:

$$u' = u_0 + (u + \delta_u)s_u$$

$$v' = v_0 + (v + \delta_u)s_v$$

Table 1 shows the results of the simulation. In this simulation, image coordinates include gaussian noise which has 0.2 of standard deviation. In Table 1, Flet-2 is the Let-2 with real image center, and OLet-2 is the Let-2 with minimized model error, as described above. $M_4$ at the right side of the column of Let-1 is a revised third training model obtained based on the Let-1, and $M_4$ at the right side of the column of OLet-2 is a revised third training model obtained based on the OLet-2. Further, Roll, Pitch and Yaw in Table 1 are angles which respectively represent rotation on the x axis, the y axis and the z axis of the camera coordinate.

TABLE 1

| | | | | | | | |
|---|---|---|---|---|---|---|---|
| Number of control Points: 280 | | | Distortion parameters: | | k = 0.1720 | | |
| Noize level: 0.2828 | | | g1 = 0.002777, | | g2 = 0.000846 | | |
| | | | g3 = 0.020896, | | g4 = 0.009532 | | |
| | | Let-1 | M4 | FLet-2 | OLet-2 | M4 | Ground truth |
| Rotation angle | Roll | 1.978 | 1.991 | 1.988 | 2.01 | 1.989 | 2.0 |
| (deg) | Pitch | 0.0 | 0.369 | 0.310 | 1.58 | 0.325 | 0.3 |
| | Yaw | 0.0 | −0.921 | −0.893 | −1.15 | −0.918 | −0.9 |
| Translation | t1 | −152.44 | −149.62 | −149.62 | −139.94 | −149.67 | −150.0 |
| (mm) | t2 | −206.76 | −199.79 | −199.78 | −197.57 | −199.76 | −200.0 |
| | t3 | 441.30 | 449.96 | 445.88 | 449.84 | 449.94 | 450.0 |
| Focal length | sx | 645.4 | 653.2 | 646.7 | 646.0 | 653.3 | 640.0 |
| (mm) | sy | 535.9 | 542.4 | 537.0 | 536.7 | 542.4 | 530.0 |
| Image center | uo | 264.2 | 260.0 | 260.0 | 245.5 | 260.0 | 260.0 |

TABLE 1-continued

| Number of control Points: 280 | | Distortion parameters: | | k = 0.1720 | | |
|---|---|---|---|---|---|---|
| Noize level: 0.2828 | | g1 = 0.002777, | | g2 = 0.000846 | | |
| | | g3 = 0.020896, | | g4 = 0.009532 | | |
| | Let-1 | M4 | FLet-2 | OLet-2 | M4 | Ground truth |
| (Pixels)          vo | 253.9 | 245.0 | 245.0 | 242.1 | 245.0 | 245.0 |
| Mean residual error | 2.108 | 0.293 | 1.871 | 1.704 | 0.286 | 0.0000 |

In Table 1, the Roll angle by FLet-2, OLet-2 or Let-1 coincides relatively well with the Ground truth (true value). As to the Pitch angle and the Yaw angle, there are several errors in the OLet-2 and Let-1. In the FLet-2, however, the Pitch and Yaw angles are precisely estimated. In the revised training model $M_4$, all parameters of the pin-hole camera model are estimated precisely. Further, a mean residual error comes under the noise level (0.2828) in the revised training model $M_4$. Table 1 shows that the optimization of this embodiment provides a good result.

Table 3 shows the results of an experiment in which image data from a real camera is adapted to the embodiment of the present invention. These image coordinates were presented by Mr. Willson at the Calibrated Imaging Laboratory of Carnegie Mellon University. The camera used in the experiment was manufactured by Photometrics Inc. and has a zooming function.

The camera was attached to a camera mount with 6 degrees of freedom. The camera orientation was also adjusted so that an optical axis of the camera was perpen-

TABLE 2

| | Roll | Pitch | Yaw | t1 | t2 | t3 | sx | sy | Control Points |
|---|---|---|---|---|---|---|---|---|---|
| Mean | 1.972 | 0.354 | −0.927 | −149.61 | −199.75 | 450.08 | 653.19 | 542.19 | 285.06 |
| Standard Deviation | 0.021 | 0.017 | 0.011 | 0.060 | 0.043 | 0.682 | 1.119 | 0.942 | 5.83 |

Table 2 shows the results of a simulation in which the revised training model $M_4$ processes 50 sets of image data with a fixed image center. Table 2 shows mean values and standard deviations of camera parameters. The 50 sets of image data are produced by the same method as used in Table 1. In Table 2, the true value of each parameter is also the same as shown in Table 1. Each camera parameter has a small deviation and close to the true value. In particular, the estimated camera position ($t_1, t_2, t_3$) is close to the true value. If the difference between the estimated camera position ($t_1, t_2, t_3$) and the actual camera position is small enough, it is determined, from Table 2, that the estimated image center is close enough to the real image center. In optimization of the training model of FIG. 2, when optimization is evaluated, the distance between the estimated camera position and the actual camera position is used because of the relation described above.

dicular to a target plane to focus. The target plane was a white plastic plate on which black dots pattern are uniformly printed by a lithograph method. The white plastic plate was fixed at a platform movable along the optical axis of the camera. The camera provided a black dot pattern image to an image process apparatus made by Matrox. The image process apparatus derived each center point coordinate of the black dots as the image coordinates and provided these data to the neural network of the embodiment.

Table 3 shows the results of camera parameter estimation of each linear estimation, and the result of Tsai's method obtained by Mr. Willson. Further, the image center in the result of Tsai's method is used for the production of the revised training model $M_4$. In the OLet-2 method, estimated error is relatively large, therefore, the Let-1 is used for production of the early training model in the embodiment. The mean residual error is low, even in comparison with the Tsai method. That shows the high degree of precision of the embodiment of the present invention.

TABLE 3

| Number of control Points: d − 0 = 377, d − 10 = 320 | | | | | | |
|---|---|---|---|---|---|---|
| | | Let-1 | OLet-2 | PLet-2 | M4 | Tsai's |
| Rotation angle | Roll | 0.08183 | 0.2139 | 0.08255 | 0.08260 | 0.05215 |
| (deg) | Pitch | 0.0 | 4.211 | 0.3895 | 0.3909 | 0.3897 |
| | Yaw | 0.0 | 1.749 | 0.05366 | 0.05306 | 0.08901 |
| Translation | t1 | −267.42 | −57.12 | −247.89 | −247.90 | −247.93 |
| (mm) | t2 | −231.09 | −317.16 | −233.71 | −233.71 | −233.72 |
| | t3 | 2823.80 | 2833.48 | 2825.78 | 2867.82 | 2870.11 |
| Focal length | sx | 4536.2 | 4521.5 | 4536.9 | 4607.5 | |
| (mm) | sy | 4524.8 | 4518.9 | 4525.5 | 4596.0 | |
| Image center | uo | 289.38 | −47.56 | 258.0 | 258.0 | 258.0 |
| (pixels) | vo | 199.81 | 336.94 | 204.0 | 204.0 | 204.0 |
| Mean residual error | | 0.9085 | 0.2139 | 0.8981 | 0.0679 | 0.0870 |

What is claimed is:

1. A camera system for measuring actual image coordinates of an object, the camera system comprising:

a camera, having a signal processing portion, for imaging the object and outputting first image coordinates of the object;

a camera model generator for outputting instruction signals, wherein the instruction signals are produced based on a pin-hole camera model using camera parameters which are derived based on an image center and a geometrical relationship between a world coordinate of x, y, and z axes, a camera coordinate of x, y, and z axes, and an image coordinates of x and y axes; and a neural network, responsive to the instruction signals provided by the camera model generator, for receiving the first image coordinates, adjusting the first image coordinates according to a difference between the first image coordinates and the instruction signals, and outputting second image coordinates having increased accuracy compared to the first image coordinates, wherein the camera model generator optimizes the instruction signals according to the second image coordinates from the neural network.

2. A camera system defined in claim 1, wherein the camera parameters are determined by linear estimation.

3. A camera system defined in claim 1, wherein the camera parameters are determined by linear equations derived by introducing parameters obtained by a least squares method into the pin-hole camera model.

4. A camera system defined in claim 3, wherein the linear equations are derived based on a supposition that an orientation of the z axis of the world coordinate is the same as an orientation of the z axis of the camera coordinate.

5. A camera system defined in claim 3, wherein the linear equations are derived based on a supposition that the image center is known.

6. A camera system defined in claim 2, wherein the camera model generator optimizes the instruction signals based on a linear estimation and the second image coordinates having increased accuracy, in which the neural network generates further accurate second image coordinates based on the optimized instruction signals from the camera model generator.

7. A camera system defined in claim 6, wherein the camera model generator optimizes the instruction signals based on a linear estimation and the second image coordinates having increased accuracy when the second image coordinates are within predetermined values.

* * * * *